May 13, 1969 J. A. VIDEON 3,443,652
VEHICLE WEIGHING DEVICE
Filed Aug. 23, 1965 Sheet 1 of 6
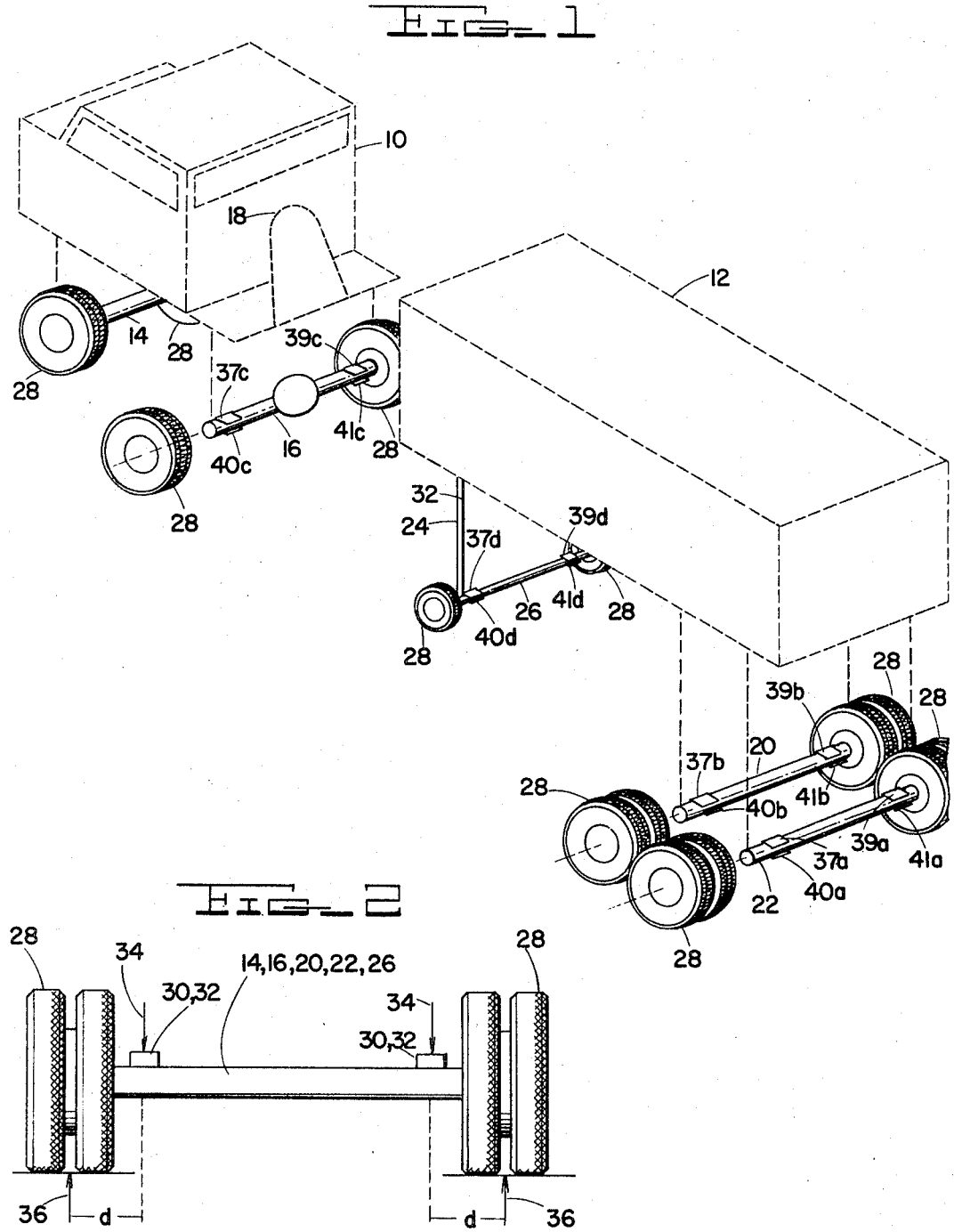
INVENTOR
JOHN A. VIDEON
BY Hood, Gust & Irish
ATTORNEYS

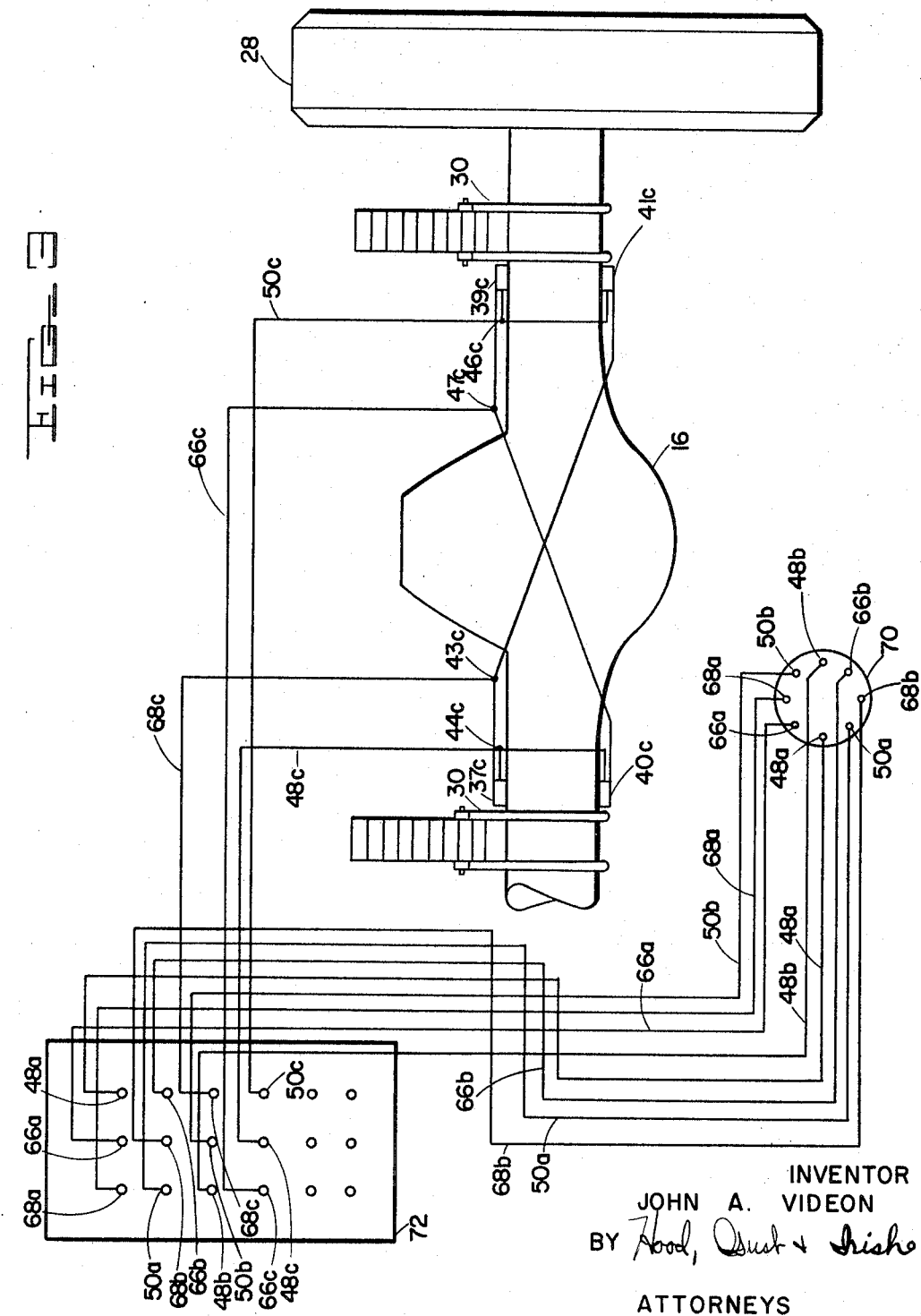

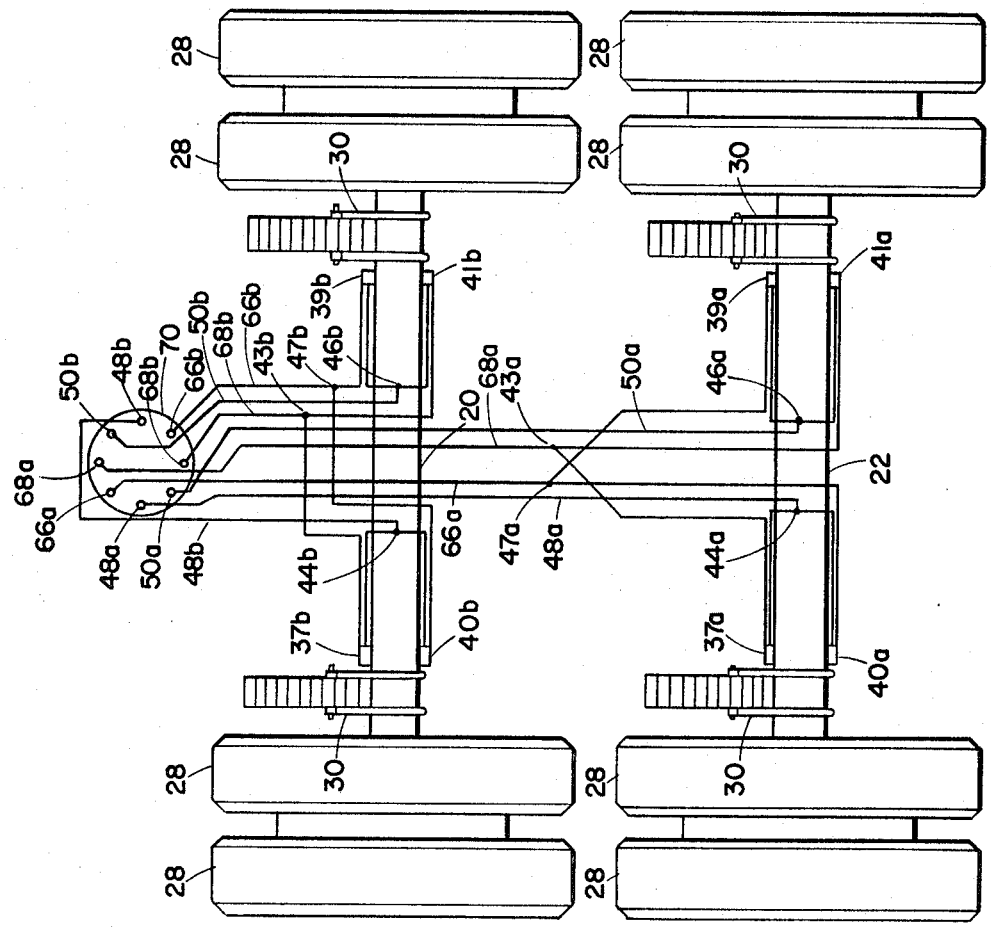

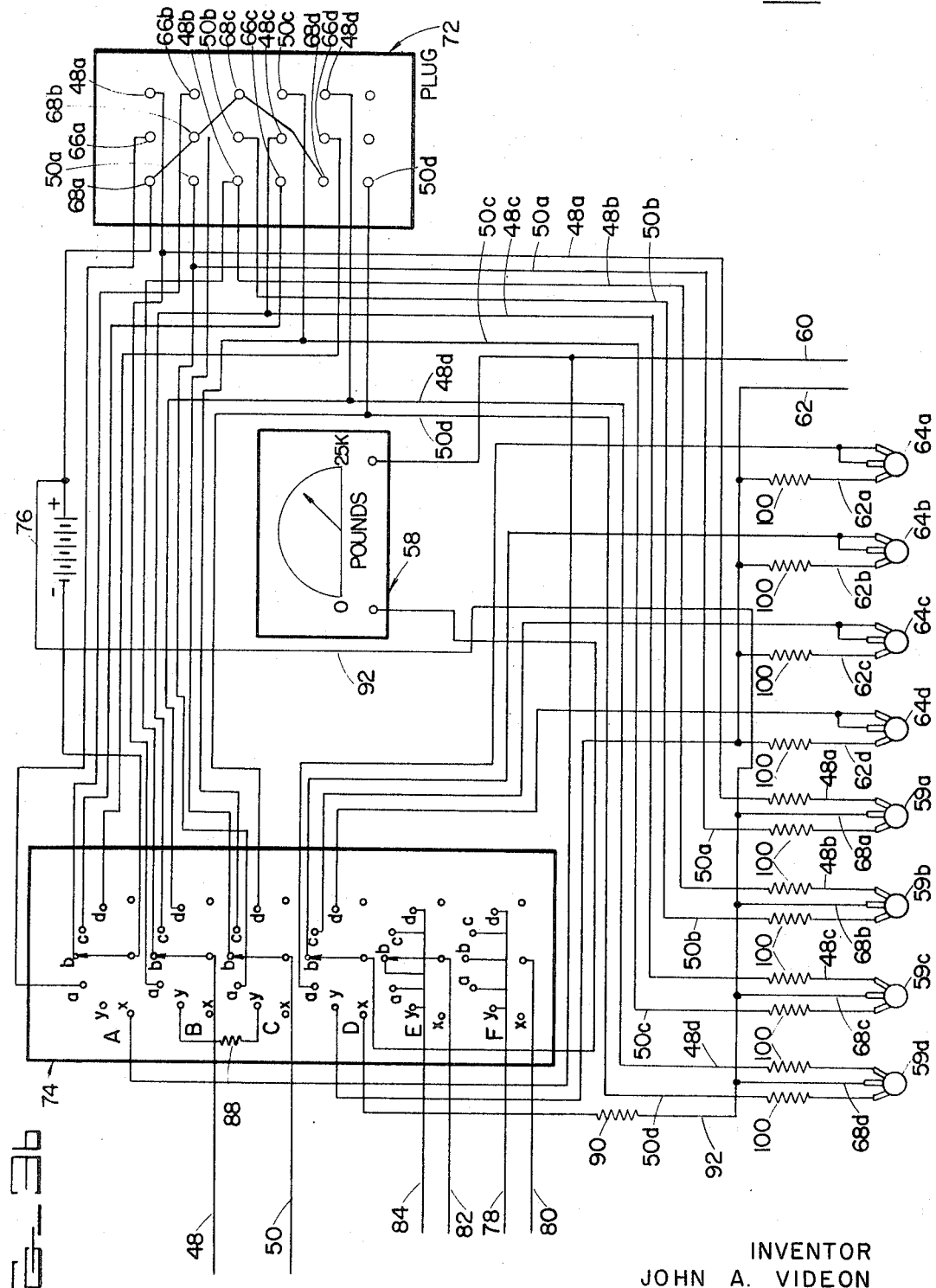

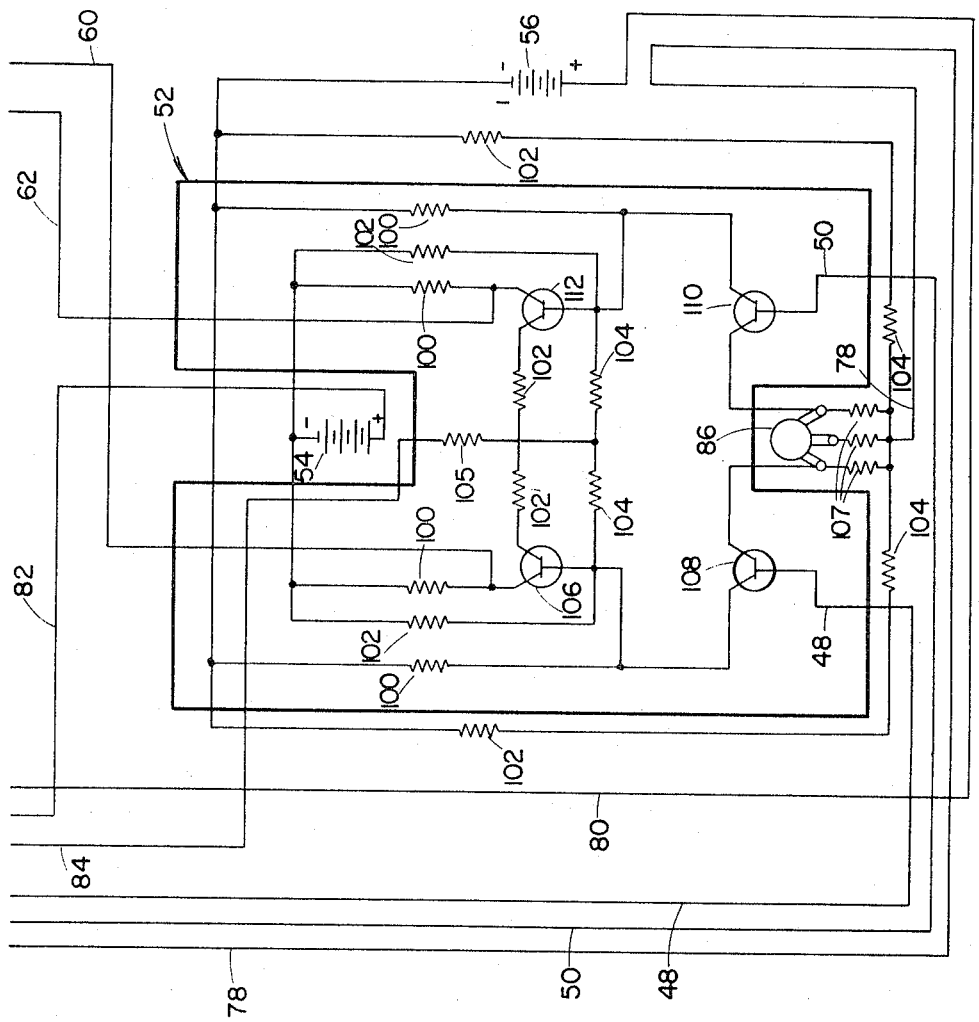

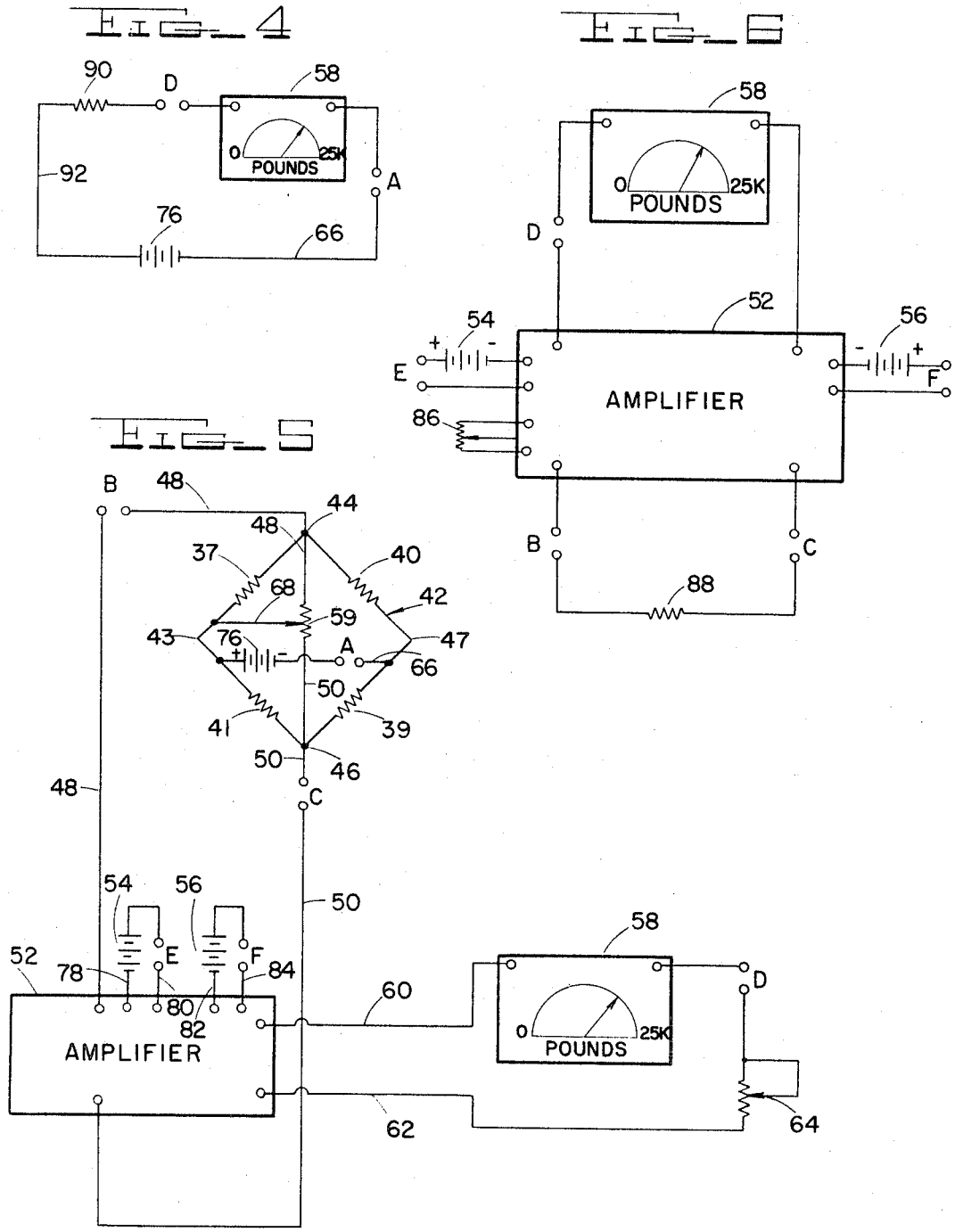

United States Patent Office 3,443,652
Patented May 13, 1969

3,443,652
VEHICLE WEIGHING DEVICE
John A. Videon, 1415 NE. 9th St.,
Gainesville, Fla. 32601
Filed Aug. 23, 1965, Ser. No. 481,704
Int. Cl. G01g 19/08, 3/14
U.S. Cl. 177—136                            9 Claims

ABSTRACT OF THE DISCLOSURE

Vehicle weighing device comprising four strain gauges positioned on the upper and lower portions of the axle to measure both tension and compression and connected into a Wheatstone bridge such that the changes in tension and compression are additive to give increased sensitivity and to obviate the use of extra strain gauges for temperature compensation.

---

The present invention relates generally to a vehicle weighing device, and more specifically to a device having strain gauges secured to the axles of a vehicle whereby the load supported by each axle of the vehicle can be determined.

Since every state today has limits on the gross weight of trucks which can legally travel over its highways, it has become more necessary than ever before to provide a device for quickly and accurately determining the weight of a truck. Each state's load limits are expressed either in terms of weight per axle or gross weight of the vehicle.

The most widely used method of determining the weight of a vehicle is by the use of a scale upon which the entire vehicle or a portion of the vehicle is driven. Consequently, a vehicle can be weighed only at those locations which have the necessary weighing facilities. Such scales are the standard of the trucking industry, mostly because of the general acceptance of this form of weighing device. Several devices have been proposed which measure the relative displacement of the springs, the relative displacement between the vehicle frame and axle and/or the forces of displacement upon the spring hangers or the springs themselves. However, devices which indicate the displacement between the vehicle frame and the axle require extensive modification of the vehicle. Further, devices which measure or indicate the relative displacement of the springs are subject to relatively large errors due to the friction and wear occurring in the vehicle undercarriage. These devices last-mentioned are also subject to large deflections and must be capable of accurately measuring without breaking. Still further, devices which measure the forces of displacement of the spring hangers of a vehicle cannot indicate the weight on each axle independently of the other axles. Therefore, it is desirable to provide a device which can be mounted on a vehicle which is not subject to the effects of friction or wear of the undercarriage of the vehicle and which can indicate each axle weight independently. Since such devices which utilize conventional strain gauges inherently are subject to errors resulting from changes in the temperature of the gauges and to errors resulting from the improper positioning of the gauges on the vehicle, it is further desirable to provide a device which cancels such errors, and other errors which are directly proportional to the elongation of the gauges so that the device can indicate the correct weight of the vehicle after an initial calibration of the device.

It is therefore the primary object of this invention to provide a vehicle weighing device which is not subject to error due to the friction or wear of the undercarriage of the vehicle, which does not require extensive modification of the vehicle, and which can indicate both the total weight of the vehicle and the weight on each individual axle of the vehicle.

Another object of this invention is to provide a vehicle weighing device which utilizes conventional strain gauges and which may be calibrated for a specific vehicle, accurately to indicate the correct weight of the vehicle without further calibration.

Still another object of this invention is to provide a vehicle weighing device which utilizes resistance strain gauges which are respectively secured to the axles of the vehicle on both sides of the point of maximum deflection of the axle when the vehicle is loaded.

A further object of this invention is to provide a vehicle weighing device which utilizes conventional resistance strain gauges without requiring the use of temperature compensating devices.

Still further, it is an object of this invention to provide a vehicle weighing device which can utilize sensing elements which undergo small changes in parameters in response to an increased load being applied to the vehicle.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a diagrammatic illustration of a vehicle having strain gauges secured to the axles thereof in accordance with this invention;

FIG. 2 is a diagrammatic illustration of one of the axles of the vehicle illustrated in FIG. 1 indicating the forces which are applied thereto;

FIG. 3 is a diagrammatic illustration of the electrical connection of the strain gauges which are secured to the rear axle of the tractor of the vehicle illustrated in FIG. 1;

FIG. 3a is a diagrammatic illustration of the electrical connection of the strain gauges secured to the two rear axles of the trailer of the vehicle illustrated in FIG. 1;

FIG. 3b is a diagrammatic illustration of the meter, switch and means by which the device of this invention is calibrated, showing the respective electrical connections thereof to the strain gauges secured to the respective axles of the vehicle as illustrated in FIGS. 3 and 3a;

FIG. 3c is a diagrammatic illustration of an amplifier which can be utilized in accordance with this invention to increase the signal of the respective strain gauges which are secured to the respective axles of the vehicle illustrated in FIG. 1;

FIG. 4 is a simplified diagrammatic illustration of the circuit illustrated in FIG. 3b which allows the meter also illustrated in FIG. 3b to be calibrated;

FIG. 5 is a simplified diagrammatic illustration of the circuit illustrated in FIGS. 3, 3a, 3b and 3c showing the electrical connection of the strain gauges secured to one of the axles of the vehicle illustrated in FIG. 1 to the amplifier illustrated in FIG. 3c, and to the meter illustrated in FIG. 3b, thereby illustrating the means by which the load on each axle can be accurately determined and indicated on the meter independently of the other axles of the vehicle even though the individual strain gauges may be subject to errors proportional to their elongation; and FIG. 6 is a simplified diagrammatic illustration of the circuit illustrated in FIGS. 3b and 3c by which the amplifier illustrated in FIG. 3c can be calibrated.

In the broader aspects of this invention, there is provided an improved measuring device for determining the axle weight of a vehicle, comprising a vehicle axle to which two pairs of strain gauges are operatively secured, a bridge means including the gauges aforementioned, and means operatively connected to the bridge means for indicating the axle weight.

Referring now to the drawings, and more specifically to FIG. 1, there is shown a conventional truck comprising a tractor 10 and a trailer 12. Both the tractor 10 and the trailer 12 have undercarriages comprising both spring and non-spring members. Axles are an example of non-spring members. Tractor 10 has front and rear axles 14 and 16, respectively, and a fifth wheel device 18 to which the trailer 12 may be attached. Trailer 12 is shown to have two rear axles 20 and 22 and a retractable strut 24 carrying an axle 26 for supporting the front end of the trailer 12 whenever the tractor 10 is not connected thereto.

Referring now to FIG. 2, the forces which act upon each of the respective axles of the vehicle illustrated in FIG. 1 are diagrammatically shown. Each of the axles 14, 16, 20, 22 and 26 are supported adjacent to their distal ends by wheels 28. Further, each of the axles support a portion of the vehicle. A portion of the weight of the vehicle is applied to each of the axles by spring hangers 30 which are secured to the axles adjacent to the wheels 28, respectively. Conventionally, strut 24 is not equipped with springs. Instead, the axle 26 is directly connected to the trailer body by strut legs 32 secured to the opposite ends of the axle 26. In both cases, however, one-half of the load borne by each of the axles is applied at each spring hanger 30 or leg 32, as indicated in FIG. 2 by the arrows 34. Supporting this axle load are forces applied to the tires 28 at opposite ends of the axle, as indicated by the arrows 36. Assuming that the forces 34 and 36 are applied to the axle at positions the same distance on either side of the axle center, each of the forces 36 equals the sum of one of the forces 34 plus the weight of one set of the wheels 28 plus the weight of one-half of the axle. Since forces 34 and 36 are applied to the axle at positions which are spaced apart a distance $d$, the maximum moment reacting on each of the axles is equal to the force 36 multiplied by the distance $d$. However, in the case of axles supported by dual wheels, whenever one of the wheels at either of the ends of the axle does not engage the surface supporting the vehicle because the other of the wheels is elevated above the supporting surface, or a tire is deflated, the forces 36 will not be equal. For example, when the interior wheel of one of the dual wheels does not engage the supporting surface, the force 36 adjacent to that wheel decreases. Since, whenever one of these forces 36 decreases, the distance $d$ associated with that force increases, the moment acting on the axle remains relatively constant. Likewise, whenever one of the forces 36 increases, the distance $d$ associated with that force decreases. Thus, the moment acting on each axle essentially varies only with the weight borne by that axle. Since it is well known that the strain of each axle is proportional to the bending moment applied thereto, the strain in each axle also will be essentially proportional to the weight borne by that axle. For this reason, this invention provides for strain gauges to be secured to each of the axles 16, 20, 22 and 26 of the vehicle illustrated in FIG. 1. In the specific embodiment illustrated, conventional resistance strain gauges are utilized; however, in other embodiments of this invention, variable reluctance, capacitive or solid-state strain gauges may be used in conjunction with associated read-out equipment (not illustrated) to measure the strain, and thus the load borne by the axles. A conventional resistance strain gauge, when secured to an axle, undergoes an elongation or compression, depending upon the placement of the gauge on that axle, whenever the axle is loaded. Whenever the length of the gauge is changed, a corresponding change in the electrical resistance of the gauge results. Thus, by measuring the change in resistance of the strain gauge, the strain of the axle and the load borne by the axle can be determined. Conventionally, the change in resistance of such a strain gauge is measured by a Wheatstone bridge. Therefore, the axle weight of a vehicle could be determined by securing a single, conventional resistance strain gauge to each axle of the vehicle and measuring the change in resistance of the respective gauges by a Wheatstone bridge. However, since the axles of conventional vehicles are relatively stiff, the resistance change of a single resistance strain gauge attached to an axle would be very small, thereby requiring a relatively accurate and sensitive indicating device to be attached to the Wheatstone bridge for indicating the weight of the vehicle. Further, since such strain gauges are temperature-sensitive, an inaccurate weight of the vehicle would most likely be reflected by the above-mentioned indicating device unless temperature compensating devices were included in the above-described system or the bridge was calibrated each time a measurement was made.

To circumvent these difficulties, the device of this invention provides for four strain gauges having the numerals 37, 39, 40 and 41 to be used on each axle, suffix letters $a$, $b$, $c$, $d$ indicating the gauges for the respective axles 22, 20, 16 and 26. As illustrated in FIG. 1, axle 22 typically has secured thereto two pairs of strain gauges 37$a$, 40$a$ and 39$a$, 41$a$ respectively positioned on opposite sides of and equally spaced apart from the point of maximum deflection of the axle when loaded. (Hereinafter the suffix letters for the numerals indicating the strain gauges will not be mentioned except when a particular axle is involved.) Since this point of maximum deflection of each axle is approximately at the center of the axle, each pair of gauges are shown to be secured to the axles equally distant from the center of the axles adjacent to the tires 28 and the spring hangers 30. Further, each gauge of the respective pairs 37, 40 and 39, 41 (with indicated letter suffixes) of gauges above-mentioned is positioned, respectively, on the top and bottom of the axles in axial alignment with the other gauge of the same pair. Thus, whenever the axle flexes in response to the moment indicated in FIG. 2 being applied to the axle, two of the gauges (gauges 40 and 41 which are secured to the bottom of the axle) are in tension and elongated, and two of the gauges (gauges 37 and 39 which are secured to the top of the axle), are in compression and shortened.

Now referring specifically to FIG. 5, it may be seen that the four strain gauges 37, 39, 40 and 41 of each axle are connected into a Wheatstone bridge 42 which comprises four (4) legs, each leg having one of the strain gauges of the axle therein. The bridge 42 has the legs having the gauges 37 and 39 (the gauges secured to the top of the axle) therein respectively connected at opposite ends thereof to the legs having the gauges 40 and 41 (the gauges secured to the bottom of the same axle) therein. If the resistance of gauge 37 becomes smaller due to the compression of the gauge, and at the same time the resistance of gauge 40 becomes larger due to the elongation of the gauge, the voltage across the terminals 44 and 43 decreases by an amount proportional to the sum of the changes in resistance of the two last-mentioned gauges. Likewise, if the resistance of the gauge 39 becomes smaller due to the compression of the gauge and the resistance of the gauge 41 becomes larger due to the elongation of the gauge, the voltage across the terminals 46 and 43 becomes larger by an amount proportional to the sum of the change in resistances of the gauges 39 and 41. Since the change in the voltage at junctures 44 and 46 have opposite signs, the potential across the junctures 44 and 46 is increased by an amount proportional to the sum of the change in resistance of all four of the gauges 37, 39, 40 and 41. By this means, the small output voltage of a single strain gauge is increased by a factor of four when the gauges are secured to the same axle and interconnected as illustrated in FIG. 5. Further, since the changes in resistance of the gauges due to temperature are the same, such errors are cancelled by the bridge circuit. For example, an increase in the resistance of each of the gauges 37 and 40 results in the voltage at the juncture 44 becoming more positive. The same resistance increases in gauges 39 and 41 result in the voltage at juncture 46 also becoming more positive, such that the voltage measured between junctures 44 and 46 remains the same.

As above-mentioned, each of the axles 16, 20, 22 and 26 of the vehicle illustrated in FIG. 1 has strain gauges 37, 39, 40 and 41 secured thereto and interconnected into a bridge circuit 42 such as that illustrated in FIG. 5. Further, each of the bridge circuits 42 are operatively connected to an amplifier 52 and a voltmeter 58 as further illustrated in FIG. 5. By this means, the voltage between junctures 44 and 46 of the bridge 42 resulting from the changes in the resistances of gauges 37, 39, 40 and 41 is amplified by the amplifier 52 and indicated on the meter 58. As indicated in FIG. 5, amplifier 52 is powered by two batteries 54, 56. Further, meter 58 is connected to the amplifier 52 in series with the potentiometer 64 for adjusting the meter 58 to zero (0) to compensate for the strain indicated by the bridge 42 resulting from the weight of the vehicle itself. Still further, the potentiometer 59 is connected to the terminals 43, 44 and 46 as shown (FIG. 5) to provide an adjustment for small differences in resistance between the respective strain gauges 37, 39, 40 and 41 and to set the initial output of the bridge 42 to zero (0).

Referring now to FIGS. 3 and 3a, there is shown the electrical connection of the strain gauges 37, 39, 40 and 41 of each of the respective axles 16, 20 and 22 of the vehicle illustrated in FIG. 1. FIG. 3a illustrates the electrical connections of the strain gauges secured to the axles 20 and 22 of the trailer 12. For clarity, reference can be made to FIG. 5 in which the bridge 42 is shown and in which the same electrical connections that are illustrated in FIG. 3a are shown diagrammatically. Each of the leads 48, 50 and 66 (FIG. 5) which are connected to the switch 74 (FIG. 3b) mentioned hereinafter and the lead 68 which is connected to the potentiometer 59 are shown in FIG. 3a to terminate at the trailer plug 70, one part of which is secured to the tractor 10 and the other part of which is secured to the trailer 12 of the vehicle illustrated in FIG. 1. Suffix letters a and b are added to the reference numerals in FIG. 3a to distinguish between those elements associated with the respective axles 22 and 20.

Referring now to FIG. 3, the electrical connections of the strain gauges secured to the axle 16 of the tractor 10 are shown. Further, leads 48a, 48b, 50a, 50b, 66a, 66b and 68a, 68b extending from the rear axles 20 and 22 of the trailer are shown to extend from the portion of plug 70 secured to the tractor 10 to the plug 72. The electrical connection of the strain gauges 37c, 39c, 40c and 41c which are secured to the axle 16 are shown to be made in a manner identical with that hereinabove described with reference to the axles 20 and 22 of the trailer 12. The leads 48c, 50c, 66c and 68c extending from the axle 16 are shown to terminate at the plug 72 as do the leads extending from the axles 20, 22 of the trailer 12.

Since each of the strain gauges 37, 39, 40 and 41 which are secured to the respective axles 16, 20 and 22 are shown to be interconnected in a similar manner with each of the other gauges secured to the same axle, letters a, b and c are used to denote axles 22, 20 and 16, respectively. While FIGS. 3 and 3a illustrate the interconnection of the strain gauges which are secured to the axles 16, 20 and 22, the remaining axles of the vehicle illustrated in FIG. 1, such as axles 14 and 26, could be outfitted with strain gauges 37, 39, 40 and 41 in an identical manner as above-described with respect to axles 16, 20 and 22 if desired. In a specific embodiment, axle 26 is outfitted with strain gauges 37d, 39d, 40d and 41d, as shown in FIG. 1. While no lead wires 48d, 50d, 66d and 68d are shown in FIGS. 3 and 3a, the plug 72 in FIG. 3b shows the interconnection of these last-mentioned leads to the switch 74, the meter 58, and the amplifier 52.

Referring now to the switch 74 shown in FIG. 3b, there is shown a 6-deck switch having decks A, B, C, D, E and F. Each of the last-mentioned decks have switch positions a, b, c and d which make the connections indicated in FIG. 5 between the strain gauges 37, 39, 40 and 41, the amplifier 52 and the meter 58 for each of the axles 16, 20, 22 and 26, respectively. Thus, switch 74 in position a connects the strain gauges 37a, 39a, 40a and 41a to the amplifier 52 and the meter 58 as indicated by FIG. 5. In switch position a, meter 58 indicates the load on axle 22. Similarly, meter 58 indicates the load upon axle 20 when the switch 74 is placed in position b; meter 58 indicates the load on axle 16 when the switch 74 is placed in switch position c, etc. Decks E and F of the switch 74 merely connect the batteries 54 and 56 to the amplifier. Since the amplifier is mounted on the vehicle 10 and must be portable, batteries 54 and 56 are provided to power the amplifier as above-mentioned. Further, deck A serves to interconnect the battery 76 across the bridge 42 and between junctures 43 and 47 of the bridge 42. Battery 76 provides the current necessary to establish the voltage differential between junctures 44 and 46 of the bridge 42.

Now referring specifically to FIG. 3c, there is shown a diagrammatic illustration of a specific amplifier 52 which can be used in this invention. The specific amplifier illustrated is a 4-transistor linear amplifier which operates to amplify the voltage difference between junctures 44 and 46 of the bridge 42 such that the meter 58 will have the requisite accuracy. While a specific amplifier 52 is illustrated in FIG. 3c, any amplifier which will linearly amplify the output of the bridge 42 and which can be made portable by powering it with batteries 54 and 56 will suffice. As shown, battery 54 is interconnected to the amplifier by leads 78 and 80 and battery 56 is interconnected to the amplifier by leads 82 and 84.

Now referring to FIG. 6, there is shown a simplified diagram of the circuit involved when the switch 74 is placed in the y position. This circuit is utilized to adjust the output or gain of the amplifier 52. Amplifier 52 is provided with a potentiometer 86 whereby this adjustment can be made. Further, the switch 74 is provided with a resistor 88 of known value which is placed in parallel connection with the amplifier 52 in place of the bridge 42 for use while this adjustment is being made. Thus, as shown in FIG. 6, the resistor 88, the amplifier 52, and the meter 58 are interconnected with each other in a manner whereby manipulation of the potentiometer 86 results in the desired adjustment of the gain of the amplifier 52.

Referring now to FIG. 4, the circuit involved when the switch 74 is placed in the x position is shown. This circuit is provided for adjusting the meter 58. In this circuit, a resistor 90 of known value is connected to the battery 76, and the meter 58 is placed in series with both the resistor 90 and the battery 76 by the decks A and D of the switch 74, as indicated. The battery 76 and the resistor 90 thereby place a known voltage across the meter 58 and the meter 58 by an adjusting means (not shown) can be calibrated or adjusted, as desired.

In the specific embodiment of the invention illustrated in the drawings, the following batteries, resistors, potentiometers, transistors and meters can have the following values or be of the following types:

| | | |
|---|---|---|
| Battery 76 | volts | 6 |
| Battery 54 | do | 15 |
| Battery 56 | do | 15 |
| Potentiometer 59 | | 1K |
| Potentiometer 64 | | 50K |
| Potentiometer 86 | | 1K |
| Resistors 88 | ohms | 120 |
| Resistor 90 | meg | 1 |
| Resistors 100 | | 10K |
| Resistors 102 | | 100K |
| Resistors 104 | | 39K |
| Transistor 106 | volts | PNP 12 |
| Transistor 108 | do | PNP 12 |
| Transistor 110 | do | PNP 12 |

| | |
|---|---|
| Transistor 112 _____volts__ | PNP 12 |
| Meter 58 _____ | 25K |
| Resistor 105 _____ | 4.7K |
| Resistors 107 _____ | 4.7K |

In operation, meter 58 is first zeroed by switching the switch 74 into the *x* position in a manner well known to those skilled in the art. Then, the gain of the amplifier 52 is adjusted with the amplifier being connected as shown in FIG. 6 in parallel with the known resistor 88 by means of adjusting the potentiometer 86. Potentiometer 86 is adjusted until the meter 58 is again zeroed. This amount of adjustment having been made, the meter 58 will indicate the total load borne by the respective axles 16, 20, 22 and 26 respectively when the switch 74 is placed in the respective switch positons *a, b, c* and *d*.

However, when only the weight of the load of the vehicle which is borne by each of the respective axles is desired, a further step of calibration is required, which is accomplished by adjusting the respective potentiometers 64 associated with each of the bridges 42 such that the weight of the vehicle itself is not indicated on the meter 58. This calibration step is accomplished with the switch 74 placed in the positions *a, b, c* and *d*, respectively. With the switch placed in these last-mentioned switch positions, the potentiometers 64*a*, 64*b*, 64*c* and 64*d* are respectively adjusted until the meter 58 is zeroed. After this adjustment has been made and the vehicle is loaded, the switch 74 then may be repositioned in the switch positions, *a, b, c* and *d* and the meter 58 read to indicate the portion of the load of the truck borne by the respective axles 16, 20, 22 and 26.

If the total weight of the trailer 12 is desired, the operator merely has to add the respective weights indicated by the meter 58 when switch 74 is successively placed in switch positions *a, b* and *d*, since the sum of each of the axle weights equals the total weight of the vehicle or the total weight of the load borne by the vehicle, depending upon which is desired and whether or not the potentiometers 64 have been adjusted as hereinabove described. In a specific embodiment, the addition of a single summing amplifier to the circuit can be made to indicate the above-mentioned weight totals. However, each amplifier used must be stabilized against temperature changes and the zero shift on the amplifier must be independently indicated and adjusted whether it be an amplifier as indicated in FIG. 3*c* or the above-mentioned summing amplifier.

While the above-described embodiment of this invention utilizes strain gauges secured to the axles of a vehicle, strain gauges could also be applied to any of the other non-spring members of the undercarriages of the tractor 10 and the trailer 12. For example, both the spring hangers 30 and the walking beams (not shown) of the undercarriages could be used instead of the axles above-mentioned.

In another specific embodiment of this invention, the amplifier 52 can be dispensed with and a null balance meter and a calibrated variable resistor in a potentiometer-type circuit can be substituted therefor for more sensitivity and accuracy. However, it must be realized that if this substitution is made, more operator skill is required.

This invention as above-described provides an improved vehicle weighing device which is not subject to errors due to the friction and wear of the undercarriage of the vehicle and does not require extensive modification of the vehicle. Further, this improved weighing device can indicate the total weight of the vehicle, the total weight of the load borne by the vehicle, and the portion of each of the same borne by each individual axle of the vehicle. Further, the improved weighing device of this invention achieves the desired accuracy without calibration after the device has first been adjusted. Still further, the improved vehicle weighing device of this invention provides for using conventional resistance strain gauges without the use of temperature compensating devices.

While there have been described above the principles of this invention in connection with specific apparatus, it is to be clearly understood that this description is made only by way of example and not as as limitation to the scope of the invention.

What is claimed is:

1. A measuring device for determining the axle weight of a vehicle comprising a vehicle axle supported by wheels at the ends thereof, two pairs of resistance strain gauges operatively secured to said axle, each of said pairs being positioned, respectively, on opposite sides of and equally spaced apart from the point of maximum deflection of said axle when loaded, the gauges of each pair being positioned, respectively, on the top and bottom of said axle in axial alignment with each other, a four-sided bridge means including said gauges for measuring the change in the resistance of said gauges when said axle flexes, said bridge means having four legs arranged in two opposite pairs, each of said legs having one of said gauges therein, one pair of said legs having therein the gauges secured to the top of said axle, the other pair of said legs having therein the gauges which are secured to the bottom of said axle, said bridge means having two terminals at opposite corners thereof, each terminal being connected between the two gauges of each gauge pair, meter means for indicating the change in resistance of said gauges, said meter means being connected to said two terminals.

2. The device of claim 1 wherein said bridge means further comprises potentiometer means connected to said meter means for balancing out differences in the resistance of said gauges.

3. The device of claim 1 wherein said meter means comprises an amplifier connected to said terminals.

4. A measuring device for determining the axle weight of a vehicle comprising a vehicle having a plurality of axles each of which are supported by wheels at the ends thereof and bear a load applied to said axles adjacent said wheels, a plurality of resistance strain gauges operatively secured to each of said axles, each of said axles having two pairs of said gauges positioned, respectively, on opposite sides of and equally spaced apart from the point of maximum deflection of said axle when loaded, the gauges of each of said pairs being positioned, respectively, on the top and bottom of an axle in axial alignment with each other, a plurality of four-sided bridge means including said gauges for measuring the change in the resistance of said gauges when said axles flex, each of said bridge means having four legs arranged in two opposite pairs, each of said legs having one of said gauges therein, one pair of said legs of each said bridge means having therein the gauges secured to the top of an axle, the other pair of said legs of each of said bridge means having a respective one of the gauges which are secured to the bottom of the same axle, there being one of said bridge means for each of said axles, each of said bridge means having two terminals at opposite corners thereof, each terminal being connected between the two gauges of each gauge pair of the respective bridge means, switch means operatively connected to said two terminals of each of said bridge means, and meter means for indicating the change in resistance of said gauges, said meter means being connected to said switch means whereby said switch means can be selectively positioned to connect said meter means to each of said bridge means.

5. The device of claim 4, wherein said vehicle is a truck tractor and trailer combination and said axles are the rear axles of said tractor and trailer.

6. The device of claim 4, wherein said vehicle is a truck tractor and trailer combination and said axles are the rear axles of said tractor and trailer and the axle of said trailer support secured to said trailer adjacent the front end thereof.

7. The device of claim 4, wherein said meter means comprises a summing means and meter, said summing means and meter operatively connected to said switch means, whereby said changes in the resistance of each of said bridge means can be totalled and indicated on said meter.

8. A measuring device for determining the axle weight of a vehicle comprising a horizontally extending non-spring member which tends to bend under the load of the vehicle, two pairs of strain gauges mounted on said non-spring member, bridge means including said gauges for measuring the strain on said non-spring member as produced by the load on said vehicle, means operatively connected to said bridge means for indicating said strain on non-spring member, said gauges being positioned on the top and bottom sides, respectively, of said non-spring member with one gauge of each pair on the top side being in compression when said member bends and the other gauge thereof on the bottom side being in tension when said member bends such that when one gauge of each pair increases in resistance the other gauge thereof decreases in resistance; and said indicating means including means for providing an indication of the average cumulative resistance change of said pairs, respectively.

9. A measuring device for determining the weight of a vehicle comprising a vehicle having an undercarriage with spring and non-spring members therein, two pairs of resistance strain gauges operatively secured to at least one of said non-spring members, said pairs being positioned, respectively, on opposite sides of and equally spaced apart from the point of maximum deflection of said non-spring member when loaded, the gauges of each pair being positioned, respectively, on opposite sides of said non-spring member in axial alignment with each other, a four-sided bridge means including said gauges for measuring the change in the resistance of said gauges when said non-spring member flexes, said bridge means having four legs arranged in two opposite pairs, each of said legs having one of said gauges therein, one pair of said legs having therein the gauges secured to one side of said non-spring member, the other pair of said legs having therein the gauges secured to the other side of said nonspring member, said bridge means having two terminals at opposite corners thereof, each terminal being connected between the two gauges of each gauge pair, meter means for indicating the change in resistance of said gauges, said meter means being connected to said two terminals.

References Cited

UNITED STATES PATENTS 3,283,838   11/1966   Fetterman et al. ____ 177—136 X

RICHARD B. WILKINSON, *Primary Examiner.*

GEO. H. MILLER, JR., *Assistant Examiner.*

U.S. Cl. X.R.

177—211